FABRICATION OF TOOLS

Filed June 20, 1958 3 Sheets-Sheet 1

INVENTORS
CECIL M. LAUGHTER &
JAMES J. LAUGHTER
BY
Marechal, Biebel, French & Bugg
ATTORNEYS

FABRICATION OF TOOLS

Filed June 20, 1958 3 Sheets-Sheet 2

INVENTORS
CECIL M. LAUGHTER &
JAMES J. LAUGHTER
BY
Marechal, Biebel, French & Bugg
ATTORNEYS Aug. 18, 1959 C. M. LAUGHTER ET AL 2,899,849
FABRICATION OF TOOLS
Filed June 20, 1958 3 Sheets-Sheet 3

INVENTORS
CECIL M. LAUGHTER &
JAMES J. LAUGHTER
BY
Marechal, Biebel, French & Bugg
ATTORNEYS United States Patent Office 2,899,849
Patented Aug. 18, 1959

2,899,849

FABRICATION OF TOOLS

Cecil M. Laughter and James J. Laughter, Kettering, Ohio

Application June 20, 1958, Serial No. 743,378

13 Claims. (Cl. 76—107)

This invention relates to punch and die assemblies for punching blanks of predetermined configuration from sheet stock.

The invention is particularly related to such tool assemblies wherein the punch is of the usual solid construction, but the die section is of the type comprising die blade material mounted in a die block of wood or other suitable material. Tool assemblies of this type as produced by prior art methods have been difficult to align with the proper accuracy, especially from the standpoint of matching of the complementary punch and die section with sufficient accuracy to produce blanks free from objectionable burrs. This has particularly proved to be the case where the die section is made first and employed to transfer the outline of the blank to punch stock, as well as where the die section is fabricated from a dimensional outline transferred thereto from a preferred punch, owing in large measure to the inherent difficulties of fabricating wood to precise tolerances from the standpoint of both dimensions and parallelism.

The present invention provides a method of fabricating punch and die assemblies of the above type which offers important practical advantages over prior art practices, and particularly which assures maximum accuracy in the dimensions and matching alignment of the complementary tool parts. More specifically, a tool assembly is produced in accordance with the invention by first fabricating the punch from an appropriate metal such as tool steel with the high accuracy which is readily obtained by conventional tool making equipment. This punch is then used as both a template and a drill jig for the necessary fabricating operations on the die block, including the cutting of the slot or slots for the die blade material and the drilling and reaming or other finishing of whatever holes may be required for mounting piercing punches. In this way, all openings in the die block for receiving parts requiring alignment with complementary portions of the punch are fabricated with such accuracy with respect to the complementary portions of the punch that maximum accuracy of alignment in the working relation of the tools is assured.

It is a primary object of the present invention to provide a method characterized as outlined above for fabricating punch and die assemblies, and particularly to provide such a method wherein the punch is fabricated first and is subsequently used as a template and drill jig during fabrication of the die section.

Another object of the invention is to provide such a method wherein the die block is slotted to receive the die blade material but without removing the portion thereof to be enclosed by the die blade material, so that this portion remains an integral part of the die block for maximum maintained rigidity in the completed die section.

It is also an object of the invention to provide a method of fabricating tool assemblies as outlined above which is equally well adapted to the production of a die section wherein the blade material telescopes with the outer periphery of the punch and a die section wherein the blade material telescopes within an opening in the face of the punch.

Further objects and advantages of the invention will be apparent from the following description, the accompanying drawings and the appended claims.

In the drawings—

Figure 1:
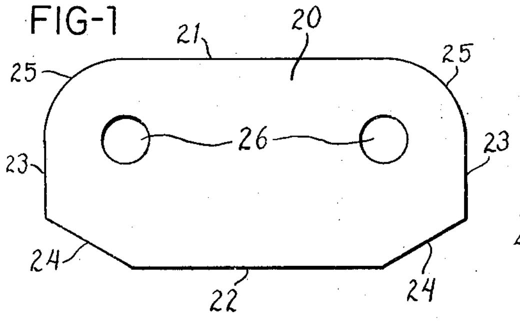
Fig. 1 shows a blank of sheet stock of a typical configuration produced by tools constructed in accordance with the invention.

Referring to the drawings, which illustrates a preferred embodiment of the invention, Fig. 1 shows a blank 20 of a type adapted to be produced by a complementary punch and die section fabricated in accordance with the invention. This blank 20 is provided with straight sides 21 and 22, straight ends 23, a pair of straight corners 24 extending at an angle between the sides 22 and the ends 23, and a pair of corners 25 each rounded about a radius. In addition, the blank 20 is provided with a pair of pierced holes 26.

Figure 2:
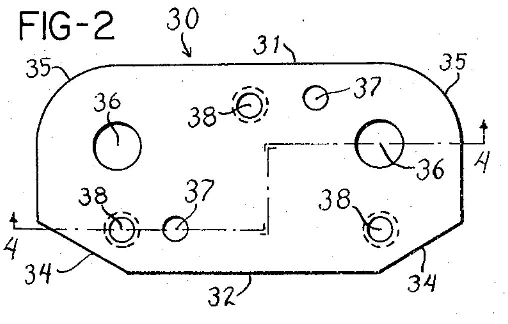
Fig. 2 is an elevational view of the working face of a punch for producing the blank of Fig. 3.

In fabricating a punch and die section for producing multiple blanks 20, the first step in accordance with the invention is to lay out the exact outline of the blank 20 on a plate of tool steel stock, which may be done by conventional accurate scribing and measuring techniques, and this part is then sawed out and accurately ground to the precise desired outline as shown at 30 in Fig. 2.

This punch 30 includes sides and corners 31—35 matching the sides and corners 21—25 of the bank 20, and holes 36 to match the holes 26 in the blank are accurately located and bored in the punch 30, as by a conventional jig borer. In addition, the blank 30 is provided with a plurality of drilled and reamed dowel holes 37 and also a plurality of drilled and tapped holes 38. Following these operations, the punch 30 is subjected to the appropriate hardening treatment.

The next step in accordance with the invention is to clamp or otherwise to secure the punch 30 temporarily to a die block 40 of hard plywood or other suitable material of appropriate size for mounting in a desired die set, with the punch being approximately centered on this block 40. Then with the punch 30 serving as a jig, dowel holes 41 are drilled and reamed in the block 40 in accurately matching alignment with the dowel holes 37, and also screw holes 42 are drilled in the block 30 in alignment with the tapped holes 38 in the punch. In addition, the outline of the punch is marked, as with pencil, on the surface of the block 40 as indicated at 43 in Fig. 3.

Figures 3, 4, 5, 6, 7:
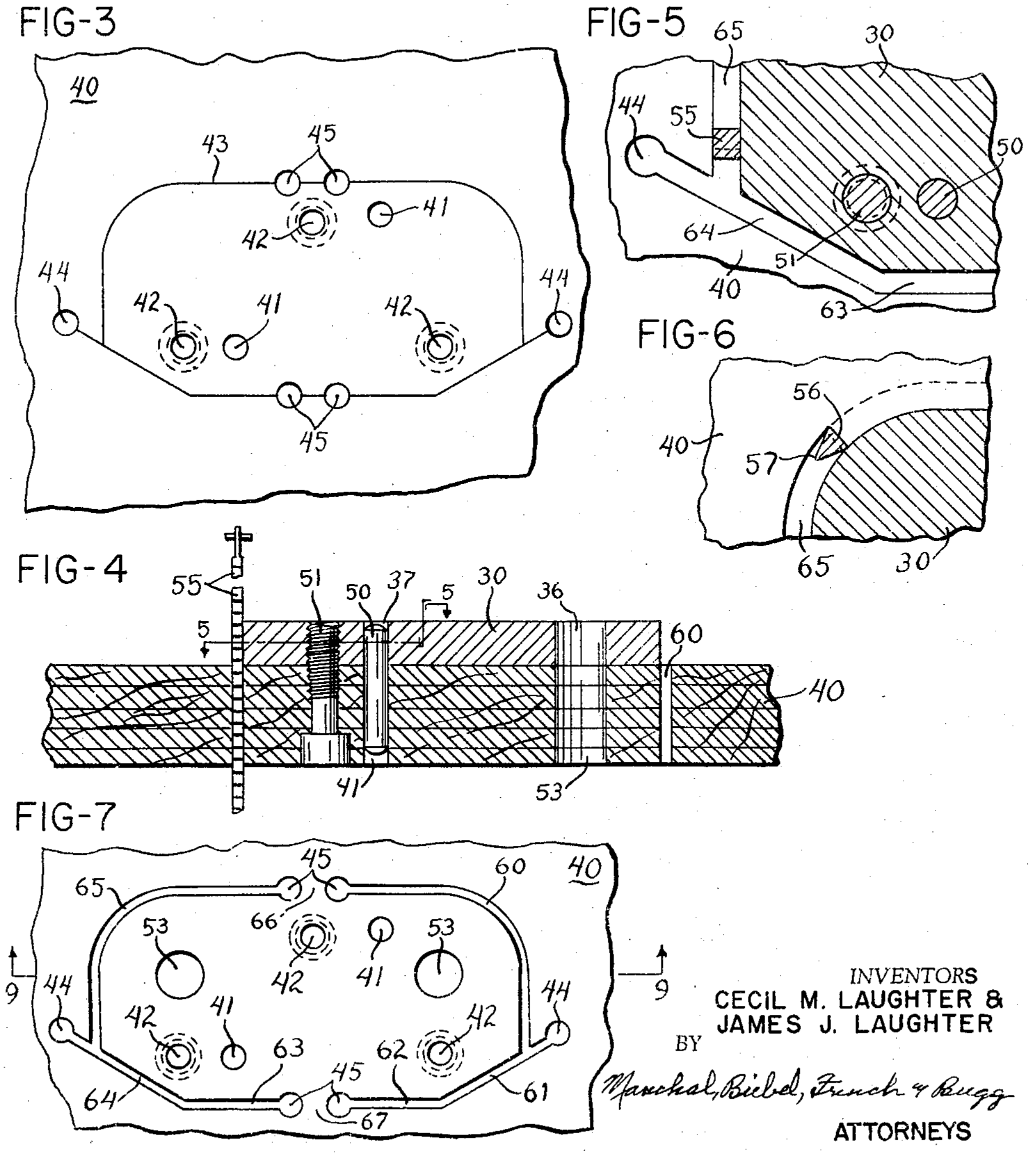
Fig. 3 is an elevational view showing the face of the die block for cooperation with the punch of Fig. 2 at an intermediate stage of its fabrication.
Fig. 4 is a sectional view, taken as indicated by the line 4—4 of Fig. 2, showing the punch mounted on the die block during the operation of sawing the slot in the die block for receiving the die blades.
Fig. 5 is an enlarged fragmentary section on the line 5—5 of Fig. 4.
Fig. 6 is a view similar to Fig. 5 showing the saw blade employed for cutting curved sections of the slot in the die block.
Fig. 7 is a view similar to Fig. 3 showing the die block following the operation illustrated in Figs. 4–6.

The punch 30 is then removed from the block 40, and the screw holes 42 are counterbored from the back of the block. In addition, a plurality of clearance holes 44 and 45 are drilled in the block 40 in alignment with the marked pattern of the punch on the block as shown in Fig. 3. The holes 44 are located beyond the outline 43 of the punch in line with straight side portions of the outline as shown, but the holes 45 are bored directly on the penciled outline 43 in closely spaced relation along the long sides of the outline 43.

Following these operations, the punch 30 is replaced on the block 40 and is firmly and accurately secured thereto by means of dowels 50 and screws 51 as shown in Fig. 4, and holes 53 are drilled and reamed in accurate alignment with the holes 36 in the punch, with the punch itself serving as a drill jig during these operations. In addition, the block 40 is provided with a discontinuous slot accurately aligned with the outer periphery of the punch 30 by means of a saw blade 55 which is guided during this operation by following the periphery of the punch as a template. In order to obtain a clear and sharply outlined slot, the saw blade 55 is preferably formed similarly to a broach with its teeth aligned with and not projecting beyond the outline of its sides as best seen in Fig. 5, and its maximum width should be predetermined to provide a slot of the proper width for press-fitting therein of the desired die blade material.

In the course of this sawing operation, the clearance holes 44 and 45 provide for insertion and removal of the saw blade 55 at appropriate positions along the outline 43, but care should be taken not to extend the slot between adjacent pairs of holes 45. Thus the sections of the slot corresponding to the side 22 and corners 24 of the blank are produced by starting the saw in each of the holes 44 to cut the corner portions and then removing the saw to the adjacent holes 45 for cutting therefrom to the corner sections. In addition, if the blank includes curved peripheral portions such as the corners 25, the corresponding sections of the slot are preferably cut by means of a saw blade 56 (Fig. 6) which is similar to the blade 55 across its cutting edge but which has the trailing portion thereof cut away as shown at 57 in Fig. 6 sufficiently to permit the blade 56 to follow a curve of relatively short radius in a kerf of the width of the blade 55.

When this sawing operation is completed, the punch is again removed from the die block 40, and the block will then have the appearance shown in Fig. 7. The slot portions 60, 61, 62, 63, 64 and 65 will extend around the complete outline of the part to be produced except for the unsawed bridge portions 66 and 67 of the block between each of the two pairs of clearance holes 45. The portion of the block within this discontinuous slot therefore remain integrally attached to the remainder of the block by these bridge portions 66 and 67, and this is an important feature of the tools produced in accordance with the invention as assuring maximum maintained rigidity in the completed die section.

Figure 8:
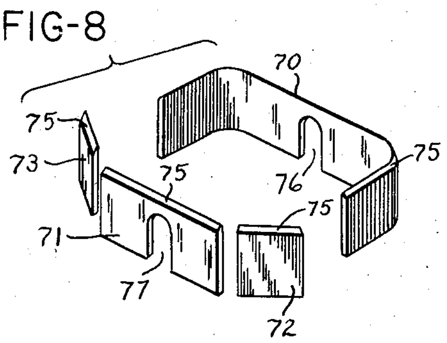
Fig. 8 is an isometric view of the die blades for mounting in the die block of Fig. 7.

Die blade material of the desired proper thickness, such as conventional steel rule stock, is then cut and formed to the proper outline to fill the discontinuous slot 60—65 and to straddle the bridge portions 66 and 67. With the particular outline of the blank 20, it is convenient to use four sections 70, 71, 72 and 73 of die blade as shown in Fig. 8, and they are arranged with their beveled edges 75 facing outwardly as shown. A significant practical advantage of the invention resulting from the particular steps employed in fabricating the slot 60—65 is that the die blades do not require precise forming to fit the slot, because minor inaccuracies in their formation will be corrected automatically as they are fitted into the slot.

Figure 9:
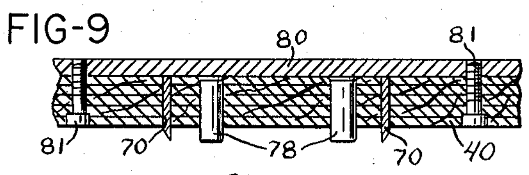
Fig. 9 is a section on the line 9—9 of Fig. 7 showing the completed die section.
Figure 10:
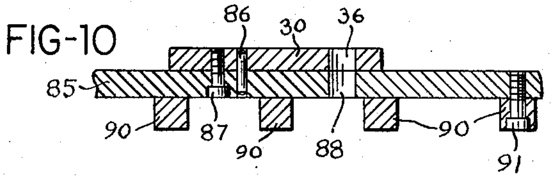
Fig. 10 is a fragmentary sectional view, taken on the same line as Fig. 4 showing the punch mounted on its retainer plate.

Fig. 8 shows that each of the blade sections 70—71 is provided with a notch 76 or 77 for receiving or straddling the bridge portion 66 or 67 respectively as these blade sections are pressed into position within the slot 60—65 as shown in Fig. 9. In addition, a piercing punch 78 is pressed into each of the reamed holes 53 in the die block 40, as also shown in Fig. 9, the holes 53 having previously been countersunk at the back surface of the block 40. Thereafter, a steel backing plate 80 is secured to the back of the die block 40, as by screws 81, to retain the die blade sections 70—73 and the punches 78 in working positions.

The punch 30 is next mounted on a steel retainer plate 85 of the appropriate size substantially matching that of the die block 40, with the punch being approximately centered on the plate 85 similarly to the location of the die blades 70—73 on the block 40. The punch is secured to the plate 85 by dowels 86 and screws 87, and the plate 85 is provided with through openings 88 in line with the holes 36 to receive the slugs produced from each blank 20 by the piercing punches 78. Riser strips 90 are then secured to the opposite side of the plate 85, as by screws 91, and these strips are spaced between the openings 88 to avoid interference with free discharge of the slugs therefrom in the operation of the device.

Figure 11:
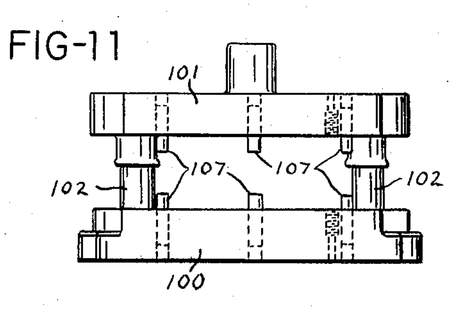
Fig. 11 is a front elevational view of a master die set for mounting the punch and die section of the invention.
Figure 12:
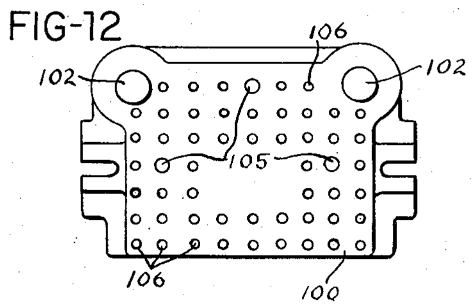
Figs. 12 and 13 are elevational views of the opposed surfaces of the plate members of the die set of Fig. 11.
Figure 13:
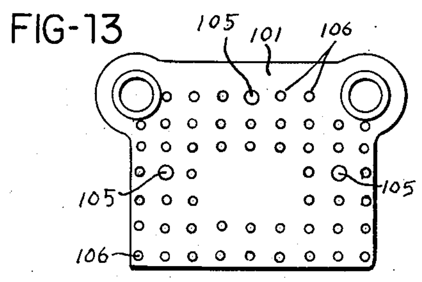
Figure 14:
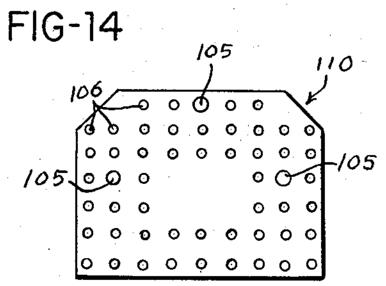
Fig. 14 is an elevational view of a drill jig employed in the fabrication of the die set of Fig. 11.

The invention also provides a very simple procedure for assuring accurate alignment of the punch 30 and its complementary die section in a die set, and particularly the invention provides for the use of a single master die set with a plurality of different punch and die devices produced in accordance with the invention. Referring to Figs. 11–14, the punch and die plates 100 and 101 respectively of the die set in Fig. 11 are of generally conventional construction, including the usual pair of guide pins 102. However, the inner surfaces of each of the plates 100 and 101 are provided with identical patterns of dowel holes 105 and tapped holes 106, and dowels 107 may be permanently mounted in the holes 105. This hole pattern 105—106 matches a similar hole pattern defined by bushings 105′ and 106′ in a drill jig 110 as shown in Fig. 14 and should initially be produced in the die set by means of such drill jig.

Figure 15:
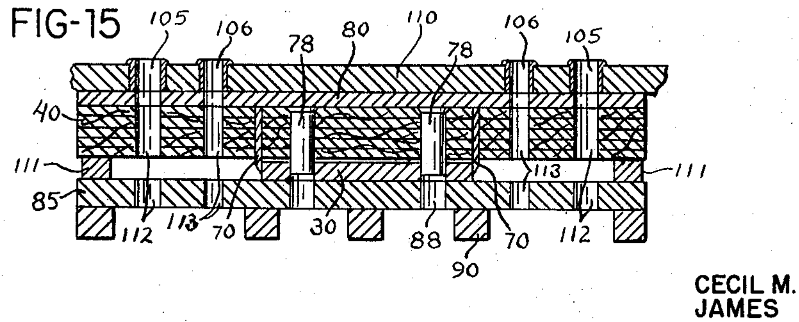
Fig. 15 is a sectional view, taken generally on the same line as Fig. 9, showing the punch and die section assembled with the drill jig of Fig. 14 in preparation for mounting on the die set of Fig. 11.

In adapting the punch and die section of the invention for mounting in the die set 100—101, the punch 30 and its complementary die section are assembled as shown in Fig. 15 with the punch telescoped partially within the die blades 70—73, and with accurate parallelism of the assembled parts being assured by spacer shims 111. These assembled parts are then clamped to the drill jig 110 as also shown in Fig. 15, and at least two dowel holes 112 are drilled and reamed through the block 40 and both of the plates 80 and 85 in accurate alignment with the dowel holes 105 in the drill jig 110. In addition, an appropriate number of screw holes 113 are drilled through both the block 40 and plate 85 through appropriately located holes 106 in the drill jig 110.

Figure 16:
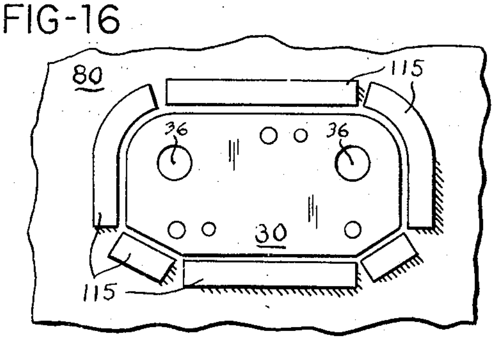
Figs. 16 and 17 are elevational views of the working faces of the completed punch and die section of Figs. 1–10.
Figure 17:
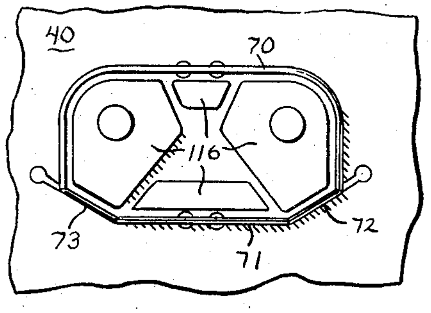

The above procedure with the drill jig 110 makes possible the use of many different punch and die assemblies with a single master die set 100—101, but this is not essential, and a punch and die constructed as described may be mounted on a conventional die set by assembling them as shown in Fig. 15 between the plates of such die set and then drilling and reaming appropriate dowel holes through the entire assembly. The punch 30 and die block 40 are also provided with sections of rubber stripper material as shown at 115 and 116 in Figs. 16 and 17. These rubber strippers may be glued in place in appropriately closely spaced relation with the working faces of the punch and die blades to permit compression of the rubber by the stock during punch operations, followed by ejection of the punched blanks from within the die blades 70—73. In addition, the sharp beveled edge on the die blades may be ground down partially for convenience and increased safety, since this edge serves no function in either the fabrication or assembly of the punch and die section in accordance with the invention.

Figure 18:
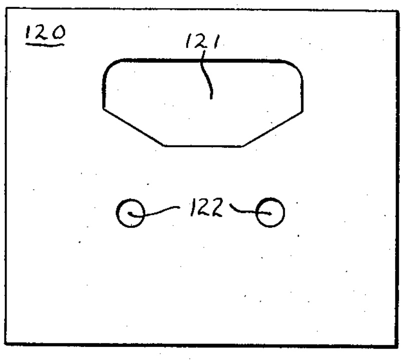
Fig. 18 shows another blank of sheet stock produced by tools constructed in accordance with the invention and including a large hole of non-uniform shape.

It will be apparent that the invention is applicable to a wide range of shapes and patterns of parts following the principles explained above in connection with the illustrated embodiment of the invention. In particular, it should be understood that while the invention has been explained in connection with a male punch and female die section, the relationship of these parts may be reversed without losing any of the advantages of the invention. Thus Fig. 18 shows a blank 120 having a hole 121 therein of the same configuration as the blank 20 and also provided with a pair of pierced holes 122, and Figs. 19—20 show a punch and a die section constructed in accordance with the invention for producing blanks 120.

The face of the punch 125 is of the same configuration as the blank 120, including a similar large hole 126 and a pair of small holes 127. The die section in Fig. 19 includes a die block 130 having die blades 131—134 mounted therein in the same manner as described for the blades 70—73 and the die block 40, but with the exception that these blades are arranged with their beveled edges facing inwardly so that they line up in use with the periphery of the hole 126 in the punch 125 and telescope within the punch in use. The discontinuous slot for receiving the blades 131—134 is produced in the same manner as the slot 60—65, using the periphery of the punch opening 126 as a template, and the punch is similarly employed as a drill jig during drilling and reaming holes in the die block 130 to receive a pair of piercing punches 135 in accurate alignment with the holes 127 in the punch 125.

Figure 19:
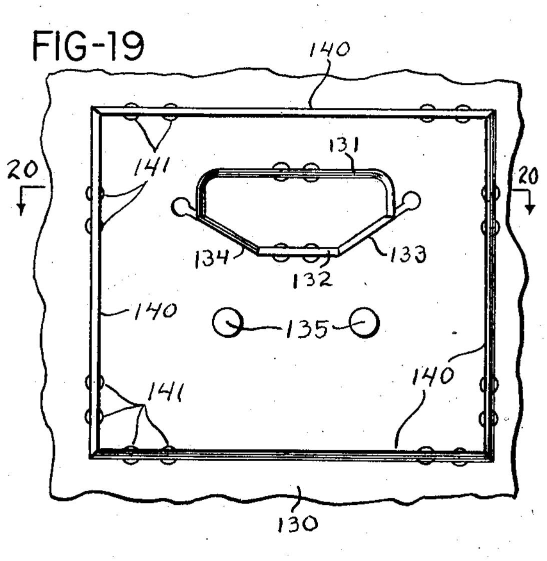
Fig. 19 is an elevational view of the working face of a die section for producing the blank of Fig. 18.
Figure 20:
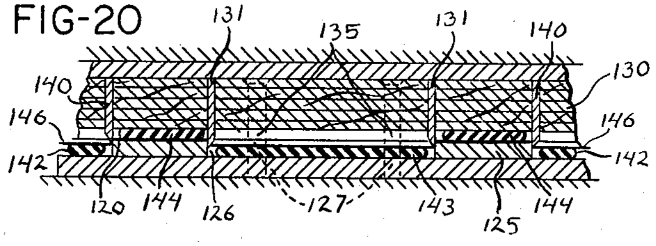
Fig. 20 is a section approximately on the line 20—20 of Fig. 19 showing the operative relation of the punch and die section in producing the blank of Fig. 18.

The punch 125 and die section 130—135 as described up to this point may be used to produce blanks 120 from precut pieces of sheet stock, but they are also shown in Figs. 19—20 as constructed to punch the blanks 120 from larger pieces of sheet stock at the same time that the holes 126—127 are produced in these blanks. For this purpose, the die block 130 carries additional die blades 140 mounted in the same manner as described for the die blades 70—73 to form a female die section cooperating with the outer periphery of the punch 125, and Fig. 19 also shows by means of the multiple pairs of clearance holes 141 that with die blades 140 of substantial length, it is desirable to provide a plurality of bridge portions between the inner and outer sections of the die block 130 to assure adequate strength. Fig. 20 shows the arrangement of rubber stripper pads 142, 143 and 144 on the punch 125 and die block 130 and their relation with the blank 120 and the scrap pieces 145 and 146 punched therefrom.

It will accordingly be seen that this invention provides a method of fabricating punch and die assemblies which not only is relatively quick and simple, but which has the great advantage of assuring great accuracy of alignment between the complementary parts. In particular, the use of the punch itself as the template and drill jig in fabricating the slots and holes in the die block for receiving the die blades and piercing punches makes possible accurately parallel alignment of the blades and piercing punches with the complementary parts of the punch as well as effectively complete freedom from the likelihood of errors which can arise in attempting to fabricate matching wooden and metal parts from relative dimensions or otherwise marked guide outlines. The invention therefore offers the combined important advantages of maximum accuracy with minimum cost.

While the methods herein described constitute preferred embodiments of the invention, it is to be understood that the invention is not limited to these precise methods, and that changes may be made therein without departing from the scope of the invention which is defined in the appended claims.

What is claimed is:

1. The method of making a device for punching blanks of predetermined configuration from sheet stock which comprises the steps of fabricating a punch of said predetermined configuration, securing said punch to a die block, cutting a slot in said block of predetermined width in accurately aligned relation with the periphery of said punch while retaining said punch secured to said block as a guide template for said cutting step, forming die blade material of the same thickness as said slot width to fit said slot, fitting said blade material in said slot, and securing a backing plate to the back surface of said block.

2. The method of making a device for punching blanks of predetermined configuration from sheet stock which comprises the steps of fabricating a punch of said predetermined configuration, securing said punch to a die block, cutting a discontinuous slot in said block of predetermined width in accurately aligned relation with the periphery of said punch, said discontinuous slot comprising slot portions having the ends thereof in closely spaced relation to leave bridge portions of said block therebetween, forming die blade material of the same thickness as said slot width to fit said slot including providing a notch in the back edge of said blade material corresponding to each of said bridge portions, fitting said blade material in said slot with said notches straddling said bridge portions, and securing a backing plate to the back surface of said block.

3. The method of making a device for punching blanks of predetermined configuration from sheet stock which comprises the steps of fabricating a punch of said predetermined configuration, fabricating a pair of dowel holes in said punch, securing said punch to a die block, drilling and reaming dowel holes in said die block matching said dowel holes in said punch with said punch serving as a jig therefor, marking the outline of said punch on said die block, removing said punch from said die block, drilling clearance holes in said die block in predetermined alignment with said marked outline thereon, resecuring said punch to said die block by means including dowels in said matching dowel holes, inserting a saw in said clearance holes, sawing a slot in said block of predetermined width in accurately aligned relation with the periphery of said punch by maintaining said saw in guide relation with the periphery of said punch, removing said punch from said die block, forming die blade material of the same thickness as said slot width to fit said slot, fitting said blade material in said slot, and securing a backing plate to the back surface of said block.

4. The method of making a device for punching from sheet stocks blanks of predetermined configuration including at least one pierced hole which comprises the steps of fabricating a punch of said predetermined configuration including each said pierced hole, securing said punch to a die block, cutting a slot in said block of predetermined width in accurately aligned relation with the periphery of said punch while retaining said punch secured to said block as a guide template for said cutting step, fabricating in said block a hole matching each said pierced hole in said punch with said punch serving as a jig for said fabricating step, forming die blade material of the same thickness as said slot width to fit said slot, fitting said blade material in said slot, fitting a piercing punch in each said hole in said block, and securing a backing plate to the back surface of said block.

5. The method of making a device for punching from sheet stock blanks of predetermined configuration including at least one pierced hole, which comprises the steps of fabricating a punch of said predetermined configuration including each said pierced hole, securing said punch to a die block, cutting a discontinuous slot in said block of predetermined width in accurately aligned relation with the periphery of said punch while retaining said punch secured to said block as a guide template for said cutting step, said discontinuous slot comprising slot portions having the ends thereof in closely spaced relation to leave bridge portions of said block therebetween, fabricating in said block a hole matching each said pierced hole in said punch with said punch serving as a jig for said fabricating step, forming die blade material of the same thickness as said slot width to fit said slot including providing a notch in the back edge of said blade material corresponding to each of said bridge portions, fitting said blade material in said slot with said notches straddling said bridge portions, fitting a piercing punch in each said hole in said block, and securing a backing plate to the back surface of said block.

6. The method of making a device for punching from sheet stock blanks of predetermined configuration including at least one pierced hole, which comprises the steps of fabricating a punch of said predetermined configuration, fabricating a pair of dowel holes in said punch, securing said punch to a die block, drilling and reaming dowel holes in said die block matching said dowel holes in said punch with said punch serving as a jig therefor, securing said punch to said die block by means including dowels in said matching dowel holes, cutting a slot in said block of predetermined width in accurately aligned relation with the periphery of said punch while retaining said punch secured to said block as a guide template for said cutting step, fabricating in said block a hole matching each said pierced hole in said punch with said punch serving as a jig for said fabricating step, removing said punch from said die block, forming die blade material of the same thickness as said slot width to fit said slot, fitting said blade material in said slot, fitting a piercing punch in each said hole in said block, and securing a backing plate to the back surface of said block.

7. The method of making a device for punching blanks of predetermined configuration from sheet stock which comprises the steps of fabricating a punch of said predetermined configuration, fabricating a pair of dowel holes in said punch, securing said punch to a die block, drilling and reaming dowel holes in said die block matching said dowel holes in said punch with said punch serving as a jig therefor, marking the outline of said punch on said die block, removing said punch from said die block, drilling clearance holes in said die block in predetermined alignment with said marked outline thereon, resecuring said punch to said die block by means including dowels in said matching dowel holes, inserting a saw in said clearance holes, sawing a discontinuous slot in said block of predetermined width in accurately aligned relation with the periphery of said punch by maintaining said saw in guided relation with the periphery of said punch, said discontinuous slot comprising slot portions having the ends thereof in closely spaced relation to leave bridge portions of said block therebetween, removing said punch from said die block, forming die blade material of the same thickness as said slot width to fit said slot including providing a notch in the back edge of said blade material corresponding to each of said bridge portions, fitting said blade material in said slot with said notches straddling said bridge portions, and securing a backing plate to the back surface of said block.

8. The method of making a device for punching from sheet stock blanks of predetermined configuration including at least one pierced hole, which comprises the steps of fabricating a punch of said predetermined configuration, fabricating a pair of dowel holes in said punch, securing said punch to a die block, drilling and reaming dowel holes in said die block matching said dowel holes in said punch with said punch serving as a jig therefor, marking the outline of said punch on said die block, securing said punch to said die block by means including dowels in said matching dowel holes, cutting a discontinuous slot in said block of predetermined width in accurately aligned relation with the periphery of said punch while retaining said punch secured to said block as a guide template for said cutting step, fabricating in said block a hole matching each said pierced hole in said punch with said punch serving as a jig for said fabricating step, said discontinuous slot comprising slot portions having the ends thereof in closely spaced relation to leave bridge portions of said block therebetween, removing said punch from said die block, forming die blade material of the same thickness as said slot width to fit said slot, including providing a notch in the back edge of said blade material corresponding to each of said bridge portions, fitting said blade material in said slot, with said notches straddling said bridge portions fitting a piercing punch in each said hole in said block, and securing a backing plate to the back surface of said block.

9. The method of making a device for punching blanks of predetermined configuration from sheet stock which comprises the steps of fabricating a punch of said predetermined configuration, securing said punch to a die block, cutting a slot in said block of predetermined width in accurately aligned relation with the periphery of said punch while retaining said punch secured to said blocks as a guide template for said cutting step, forming die blade material of the same thickness as said slot width to fit said slot, fitting said blade material in said slot, securing a backing plate to the back surface of said block, securing said punch to a retainer plate, assembling said die block and said retainer plate in superimposed relation with said punch telescoped with said die blades, boring aligned mounting holes through said die block and both of said plates while retaining said punch and said die blades in telescoped relation, providing aligned mounting holes in a die set matching said mounting holes in said die block and retainer plate, and mounting said die block and said retainer plate in said die set by means of said mounting holes.

10. The method of making a device for punching blanks of predetermined configuration from sheet stock which comprises the steps of fabricating a punch of said predetermined configuration, securing said punch to a die block, cutting a discontinuous slot in said block of predetermined width in accurately aligned relation with the periphery of said punch, said discontinuous slot comprising slot portions having the ends thereof in closely spaced relation to leave bridge portions of said block therebetween, forming die blade material of the same thickness as said slot width to fit said slot including providing a notch in the back edge of said blade material corresponding to each of said bridge portions, fitting said blade material in said slot with said notches straddling said bridge portions, securing a backing plate to the back surface of said block, securing said punch to a retainer plate, assembling said die block and said retainer plate in superimposed relation with said punch telescoped with said die blades, boring aligned mounting holes through said die block and both of said plates while retaining said punch and said die blades in telescoped relation, providing aligned mounting holes in a die set matching said mounting holes in said die block and retainer plate, and mounting said die block and said retainer plate in said die set by means of said mounting holes.

11. The method of making a device for punching blanks of predetermined configuration from sheet stock which comprises the steps of fabricating a punch of said predetermined configuration, securing said punch to a die block, cutting a slot in said block of predetermined width in accurately aligned relation with the periphery of said punch while retaining said punch secured to said block as a guide template for said cutting step, forming die blade material of the same thickness as said slot width to fit said slot, fitting said blade material in said slot, securing a backing plate to the back surface of said block, securing said punch to a retainer plate, providing a die set and a drill jig having a plurality of aligned holes therethrough, securing said drill jig and said die block and retainer plate in superimposed relation with said punch telescoped with said die blades, and boring aligned mounting holes through said die block and both of said plates by means of said drill jig while retaining said punch and die blades in telescoped relation for subsequent mounting in said die set by means of said holes.

12. The method of making a device for punching blanks of predetermined configuration from sheet stock which comprises the steps of fabricating a punch of said predetermined configuration, cutting a slot in a die block of predetermined width and corresponding accurately with said predetermined configuration, forming die blade material of the same thickness as said slot width to fit said slot, fitting said blade material in said slot, securing a backing plate to the back surface of said block, securing said punch to a retainer plate, assembling said die block and said retainer plate in superimposed relation with said punch telescoped with said die blades, boring aligned mounting holes through said die block and both of said plates while retaining said punch and said die blades in telescoped relation, providing aligned mounting holes in a die set matching said mounting holes in said die block and retainer plate, and mounting said die block and said retainer plate in said die set by means of said mounting holes.

13. The method of making a device for punching blanks of a predetermined configuration from sheet stock which comprises the steps of fabricating a punch of said predetermined configuration, cutting a slot in a die block of predetermined width and corresponding accurately with said predetermined configuration, forming die blade material of the same thickness as said slot width to fit said slot, fitting said blade material in said slot, securing a backing plate to the back surface of said block, securing said punch to a retainer plate, providing a die set and a drill jig having a plurality of aligned holes therethrough, securing said drill jig and said die block and retainer plate in superimposed relation with said punch telescoped with said die blades, and boring aligned mounting holes through said die block and both of said plates by means of said drill jig while retaining said punch and die blades in telescoped relation for subsequent mounting in said die set by means of said holes.

References Cited in the file of this patent

UNITED STATES PATENTS

| | | |
|---|---|---|
| 1,701,546 | Shaw | Feb. 12, 1929 |
| 1,995,711 | Irmis | Mar. 26, 1935 |
| 2,186,799 | Boker | Jan. 9, 1940 |
| 2,495,221 | Berlin | Jan. 24, 1950 |
| 2,787,922 | Bien | Apr. 9, 1957 |
| 2,821,871 | Sarno | Feb. 4, 1958 |
| 2,850,096 | Berlin et al. | Sept. 2, 1958 |
| 2,860,555 | Williamson | Nov. 18, 1958 |